US009146624B2

(12) United States Patent
Zhao et al.

(10) Patent No.: US 9,146,624 B2
(45) Date of Patent: Sep. 29, 2015

(54) METHOD FOR MANAGING SCREEN ORIENTATION OF A PORTABLE ELECTRONIC DEVICE

(75) Inventors: Hong Zhao, Naperville, IL (US); LieJun Tao, Grayslake, IL (US); Dean E. Thorson, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 70 days.

(21) Appl. No.: 13/368,853

(22) Filed: Feb. 8, 2012

(65) Prior Publication Data

US 2013/0201219 A1 Aug. 8, 2013

(51) Int. Cl.
*G06F 3/0346* (2013.01)
*G06F 3/01* (2006.01)
*G06F 1/16* (2006.01)

(52) U.S. Cl.
CPC ............ *G06F 3/0346* (2013.01); *G06F 1/1686* (2013.01); *G06F 1/1694* (2013.01); *G06F 3/012* (2013.01); *G06F 3/013* (2013.01); *G06F 2200/1614* (2013.01); *G06F 2200/1637* (2013.01)

(58) Field of Classification Search
CPC ... G09G 2340/0492; G09G 5/00; G09G 5/39; G06F 3/017; G06F 3/0346; G06F 1/1694; H04N 9/045; H04M 1/72522
USPC .......................................................... 345/659
See application file for complete search history.

(56) References Cited

U.S. PATENT DOCUMENTS

| 6,246,862 | B1 | 6/2001 | Grivas et al. |
| 7,251,350 | B2 | 7/2007 | Tsirkel et al. |
| 7,636,456 | B2 | 12/2009 | Collins et al. |
| 7,643,658 | B2 | 1/2010 | Kilner et al. |
| 2007/0004451 | A1* | 1/2007 | Anderson .................. 455/556.1 |
| 2007/0126884 | A1 | 6/2007 | Xu et al. |

(Continued)

FOREIGN PATENT DOCUMENTS

| EP | 2280331 A1 | 2/2011 |
| JP | 2011041067 A | 2/2011 |
| KR | 20070039790 A | 4/2007 |

OTHER PUBLICATIONS

Slide Share, "Developing AIR for Android with Flash Professional CS5", May 3, 2011, 2 pages, http://www.slideshare.net/chrisgriffith/developing-air-for-android-with-flash-professional.
Sharpgis, "Using the Accelerometer to Control Planar Transforms on Windows Phone 7", May 3, 2011, 1 page, http://www.sharpgis.net/post/2011/03/28/Using-the-accelerometer-to-control-planar . . . .
Doug Vargha and Michael Maia, "An Overview of Motion Processing Solutions for Consumer Product", 8 pages.

(Continued)

*Primary Examiner* — Mark Zimmerman
*Assistant Examiner* — Sarah Le
(74) *Attorney, Agent, or Firm* — Shumaker & Sieffert, P.A.

(57) ABSTRACT

There is described a portable electronic device capable of managing screen orientation. The portable electronic device comprises a display, a motion sensor, an image sensor and a processor. The display provides an image at a first orientation. The motion sensor attempts to detect a rotation of the portable electronic device. The image sensor attempts to detect one or more body features. The processor determines a second orientation of the image at the display based on the rotation detected at the motion sensor and/or the body feature or features detected at the image sensor. The portable electronic device may determine an orientation of the image at the display in response to detecting the rotation at the motion sensor and/or the body feature or features at the image sensor.

21 Claims, 7 Drawing Sheets

(56) References Cited

U.S. PATENT DOCUMENTS

| | | |
|---|---|---|
| 2007/0285528 A1 | 12/2007 | Mise et al. |
| 2008/0118152 A1 | 5/2008 | Thorn et al. |
| 2008/0181502 A1 | 7/2008 | Yang |
| 2009/0262078 A1 | 10/2009 | Pizzi |
| 2010/0066763 A1 | 3/2010 | Macdougall et al. |
| 2010/0076720 A1* | 3/2010 | Mori et al. .................. 702/150 |
| 2010/0117949 A1 | 5/2010 | Lai et al. |
| 2011/0037866 A1 | 2/2011 | Iwamoto |
| 2011/0098024 A1 | 4/2011 | Shin et al. |
| 2011/0275317 A1* | 11/2011 | Ryu .......................... 455/41.1 |
| 2011/0298887 A1 | 12/2011 | Maglaque |

OTHER PUBLICATIONS

Hong Zhao, "Electronic Device and Method for Backlight Control", Dec. 30, 2010, 17 pages; U.S. Appl. No. 12/982,474.

Patent Cooperation Treaty, "PCT Search Report and Written Opinion of the International Searching Authority" for International Application No. PCT/US2013/021872 dated Apr. 22, 2013, 15 pages.

Amendment Under PCT Article 19 from related PCT Application No. PCT/US2013/021872, filed Jun. 19, 2013, 5 pages.

International Preliminary Report on Patentability for PCT/US2013/021872, mailed Aug. 21, 2014, 10 pages.

Office Action from counterpart Korean Application No. 10-2014-7025036, dated Jun. 24, 2015, 9 pp.

* cited by examiner

METHOD FOR MANAGING SCREEN ORIENTATION OF A PORTABLE ELECTRONIC DEVICE

FIELD OF THE INVENTION

The present disclosure relates generally to a portable electronic device and more particularly to a method and apparatus for managing screen orientation of a portable electronic device.

BACKGROUND OF THE INVENTION

Portable electronic devices are increasingly being used for accessing content, applications and functionalities. For example, a portable electronic device may include a touch-sensitive screen that enables one to interact directly with what is displayed. The touch-sensitive screen can be used to activate a function of the electronic device or otherwise interact with a user. Users typically use the touch-sensitive screen in two basic orientations, namely a portrait orientation in which the screen is viewed vertically and a landscape orientation in which the screen is viewed horizontally.

A portable electronic device may include an accelerometer to assist with portrait-to-landscape rotations and landscape-to-portrait rotations of its screen. The accelerometer of the device measures device orientation relative to the gravity of Earth and, then, rotates the screen accordingly. Due to the limits of physical law, the orientation cannot be resolved when the device lies flat relative to the surface of the ground. In fact, automatic screen rotation often doesn't work when the device is more horizontal than vertical relative to the surface of the ground. Many users, particularly those who understand the physical limitations of conventional screen rotation, avoid the problem by positioning the device vertically whenever screen rotation is desired.

DETAILED DESCRIPTION OF THE EMBODIMENTS

There is described a portable electronic device, and method thereof, for managing automatic rotation of an image or object at an output component (such as a display) of the device. A first sensor (such as a motion sensor) of the device is used to detect rotation movement of the device, and a second sensor (such as an imager capable of detecting still image and/or motion video) is used to determine the orientation of the image or object relative to the output component. In particular, the second sensor enhances the device's ability to determine whether the image or object should be in a portrait orientation or a landscape orientation.

For one embodiment, the second sensor may be activated in response to the first sensor detecting that the tilt angle of the device relative to the ground surface falls below a predetermined threshold. The predetermined threshold may be determined based on an angle at which the device may not be able to distinguish between portrait and landscape orientations using one sensor alone. Thus, for this embodiment, the second sensor detects a body feature of a user, such as a facial feature of a user's face, and then the image or object may be oriented at the output component according to the detected body feature. Thus, when a user views the image or object at the output component, the image or object is provided at an appropriate orientation for viewing. By considering the tilt angle measured by the first sensor and the facial features detected by the second sensor, automatic landscape-portrait screen rotations may be managed to operate appropriately at all angles.

An aspect of the present invention is a method of a portable electronic device for managing screen orientation. The device attempts to detect a rotation at a motion sensor, and the device attempts to detect one or more body features at an image sensor. Thereafter, an orientation of an image at a display is determined in response to detecting the rotation at the motion sensor, the body feature or features at the image sensor, or both.

Another aspect of the present invention is a portable electronic device capable of managing screen orientation, in which the device comprises a display, a motion sensor, an image sensor and a processor. The display is configured to provide an image at a first orientation. The motion sensor is configured to attempt to detect rotation of the portable electronic device, and the image sensor is configured to attempt to detect one or more body features. The processor is configured to determine a second orientation of the image at the display based on the rotation detected at the motion sensor, the body feature or features detected at the image sensor, or both.

Figure 1A:
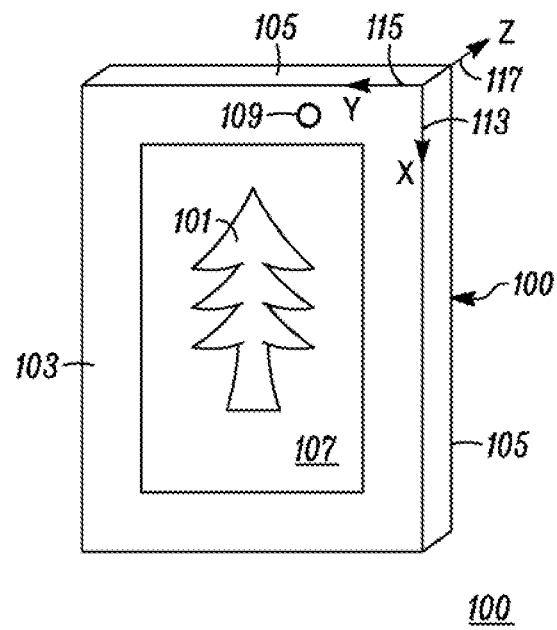
FIGS. 1A and 1B are perspective views of an embodiment of a portable electronic device in accordance with the present invention.
Figure 1B:
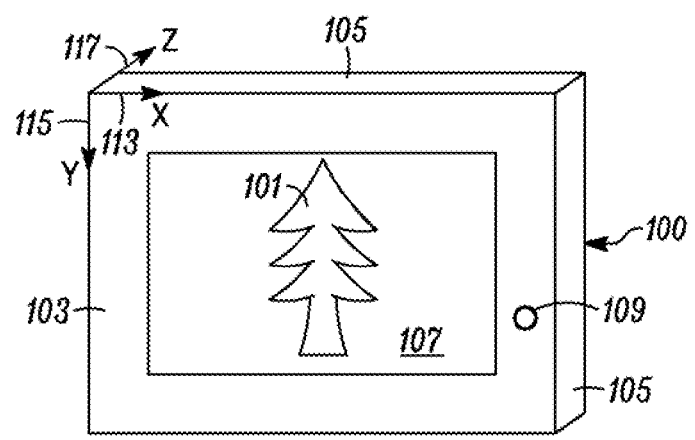

Referring to FIGS. 1A and 1B, there are provided perspective views of an embodiment of a portable electronic device 100 in accordance with the present invention. The portable electronic device 100 may be any type of device having an output component providing an object or image 101 and two or more input components or sensors that may be used for managing an orientation of the output component or, more particularly, the object or image 101 provided by the output component. For example, the portable electronic device 100 may include a display, a motion sensor and an image sensor. Examples of a portable electronic device 100 include, but are not limited to, a computing device, tablet device, handheld device, productivity device, media player, media reader, communication device (wireless or wired), scanner, network browser, e-commerce device, measuring device, and the like. The portable electronic device 100 may have one of a variety of different form factors including, but not limited to, a tablet, candy bar, flip/clamshell, slider, qwerty slider, rotator, wearable form factor (such as a wristband or armband), or the like. For the embodiment shown in FIG. 1, the device 100 has a front surface 103 and a plurality of side surfaces 105 substantially angled from the front surface.

The portable electronic device 100 includes at least one output component and at least two input components or sensors. For one embodiment, like the one shown in FIG. 1, the device 100 includes a display 107 (such as an LCD, OLED, LED, or the like) which functions as an output component. For another embodiment, the display 107 may include a display having a touch sensor or surface (capacitive, resistive, temperature, or the like) overlaying at least a portion of the display. The front surface of the display 107 may be exposed at an angle or view that is substantially parallel to the front surface 103 of the device 100. An object or image 101 is provided by the output component.

The portable electronic device 100 also includes at least two input components or sensors. For one embodiment, like the one shown in FIG. 1, the device 100 includes a motion sensor (not shown) and an image sensor 109. For other embodiments, the device 100 may include multiple motion sensors, multiple image sensors, a motion sensor and another input component (such as an acoustic sensor), an image sensor and another input component, or the like. Examples of motion sensors include, but are not limited to, mechanical sensors and electrical sensors, such as an accelerometer, gyroscope, or compass. Examples of image sensors include, but are not limited to, image sensors (including charge-coupled device and complementary metal-oxide semiconductor sensors), video sensors, light sensor, IR or near-IR sensors, thermo sensors, multi-spectral sensors, gamma sensors, x-ray sensors, and the like.

As represented in FIG. 1, sensors may detect movement and/or orientation in an x-direction 113 and a y-direction 115 of the device 100, which are both parallel to the front surface 103 of the device and the display 107. The x-direction 113 and the y-direction 115 are also orthogonal to each other. The sensors may also detect movement in a z-direction 117 of the device 100, which is orthogonal to the x-direction 113 and the y-direction 115 as well as the front surface 103 of the device and the display 107.

Figure 2:
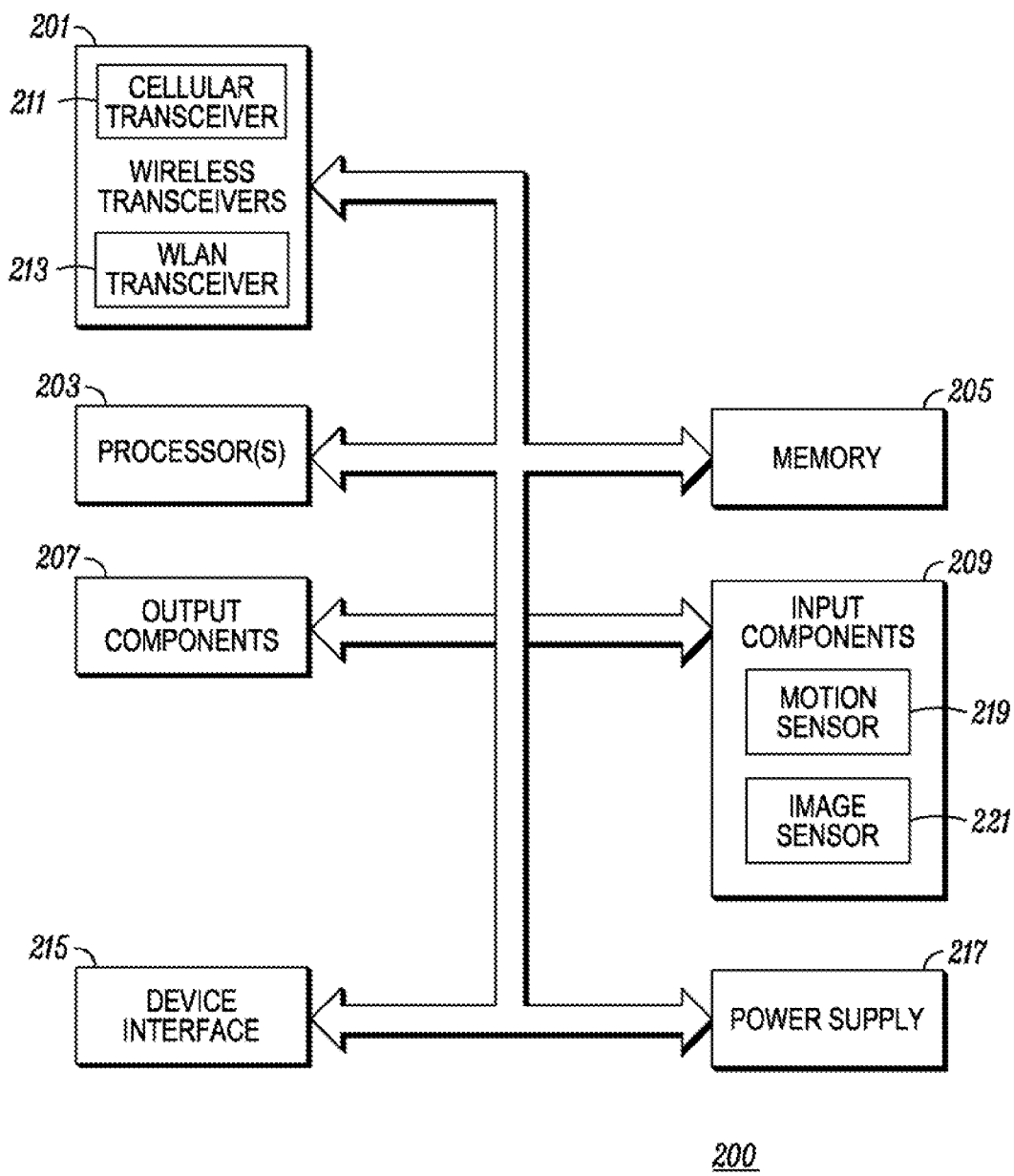
FIG. 2 is a block diagram representing example internal components of a portable electronic device in accordance with the present invention.

Referring to FIG. 2, there is shown a block diagram representing example components 200 that may be used for an embodiment in accordance with the present invention. The example embodiment may include one or more wireless transceivers 201, one or more processors 203, one or more memories 205, one or more output components 207, and one or more input components 209. Each embodiment may include a user interface that comprises one or more output components 207 and/or one or more input components 209. Each wireless transceiver 201 may utilize wireless technology for communication, such as, but not limited to, cellular-based communications such as analog communications (using AMPS), digital communications (using CDMA, TDMA, GSM, iDEN, GPRS, or EDGE), and next generation communications (using UMTS, WCDMA, LTE, LTE-A or IEEE 802.16) and their variants, as represented by cellular transceiver 211. Each wireless transceiver 201 may also utilize wireless technology for communication, such as, but are not limited to, peer-to-peer or ad hoc communications such as HomeRF, Bluetooth and IEEE 802.11(a, b, g or n), wireless HDMI; wireless USB, and other forms of wireless communication such as infrared technology, as represented by WLAN transceiver 213. Also, each transceiver 201 may be a receiver, a transmitter or both.

The processor 203 may generate commands based on information received from one or more input components 209. The processor 203 may process the received information alone or in combination with other data, such as the information stored in the memory 205. Thus, the memory 205 of the internal components 200 may be used by the processor 203 to store and retrieve data. The data that may be stored by the memory 205 includes, but not limited to, operating systems, applications, and data. Each operating system includes executable code that controls basic functions of the portable electronic device 100, such as interaction among the components of the internal components 200, communication with external devices via each transceiver 201 and/or the device interface (see below), and storage and retrieval of applications and data to and from the memory 205. Each application includes executable code utilizing an operating system to provide more specific functionality for the portable electronic device. Data is non-executable code or information that may be referenced and/or manipulated by an operating system or application for performing functions of the portable electronic device 100.

The input components 209, such as a motion sensor, an image sensor, a touch sensitive surface of a display, or other components of the user interface, may produce an input signal in response to a user input. For example, the device 100 may include one or more motion sensors, such as an accelerometer or compass. For another example, the device 100 may include one or more image sensors, such as a camera, a charge-coupled device, complementary metal-oxide semiconductor sensors, video sensors, light sensor, IR or near-IR sensors, thermo sensors, multi-spectral sensors, gamma sensors, x-ray sensors, or the like. In addition, the input components 209 may include an audio input component such as a microphone, or another type of mechanical input component or activator such as button or key selection sensors or switch.

Likewise, the output components 207 of the internal components 200 may include one or more video, audio and/or mechanical outputs. For example, the output components 207 may include the visible display, such as the display 107. Other output components 207 may include a video output component such as a touch screen, a cathode ray tube, liquid crystal display, plasma display, incandescent light, fluorescent light, front or rear projection display, and light emitting diode indicator. Other examples of output components 207 include an audio output component such as a speaker, alarm and/or buzzer, and/or a mechanical output component such as vibrating or motion-based mechanisms.

The internal components 200 may further include a device interface 215 to provide a direct connection to auxiliary components or accessories for additional or enhanced functionality. In addition, the internal components 200 preferably include a power source 217, such as a portable battery, for providing power to the other internal components and allow portability of the portable electronic device 100.

Referring again to the input components 209 of the internal components 200, one embodiment may includes a motion sensor 119 to detect the motion data and an image sensor 221 to enhance the analysis and/or interpretation of the detected motion data.

It is to be understood that FIG. 2 is provided for illustrative purposes only and for illustrating components of a portable electronic device 100 in accordance with the present invention, and is not intended to be a complete schematic diagram of the various components required for a portable electronic device. Therefore, a portable electronic device may include various other components not shown in FIG. 2, or may include a combination of two or more components or a division of a particular component into two or more separate components, and still be within the scope of the present invention.

Figure 3A:
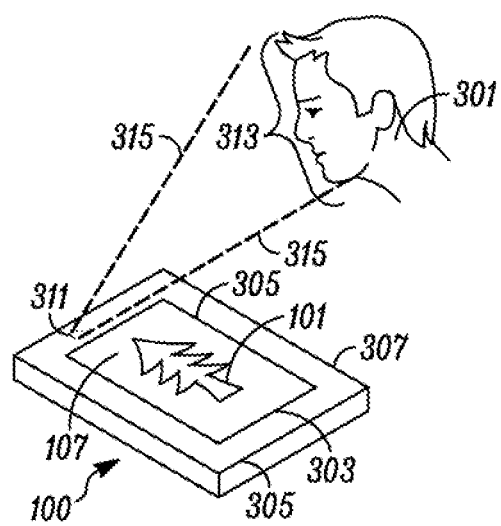
FIGS. 3A and 3B are perspective views illustrating image sensor views of a portable electronic device in accordance with the present invention.
Figure 3B:
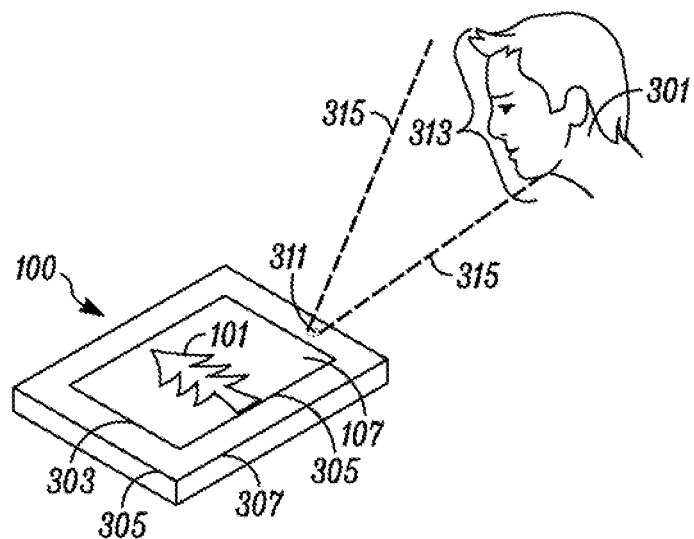

Referring to FIGS. 3A and 3B, there are shown perspective views illustrating image sensor views of the portable electronic device 100. When the device 100 positioned horizontally in which the display 107 is positioned substantially horizontal to the ground surface, the motion sensor of the device may not be able to determine the appropriate orientation of the image or object 101 of the output component, such as whether an image should be in a portrait orientation or a landscape orientation at a display.

FIG. 3A illustrates an embodiment of the portable electronic device 100 in which the appropriate orientation of the image 101 is a portrait orientation, because the user 301 is viewing the device from a shorter side 303 of the display or a shorter 305 side of the device. The shorter side 303 of the display is relative to a longer side 307 of the display 107 substantially perpendicular to the shorter side of the display. Likewise, the shorter side 305 of the device 100 is relative to a longer side 309 of the device substantially perpendicular to the shorter side of the device.

At this horizontal position substantially parallel to the ground surface, the portable electronic device has difficultly determining the appropriate orientation for providing the image or object 101 based on the motion sensor alone. Thus, the portable electronic device 100 includes a second input component to assist or supplement the operation of the motion sensor by determining the position of the user 301 relative to the display 107 and/or device 100. For the embodiment shown in FIGS. 3A and 3B, the portable electronic device 100 includes an image sensor 311 that is capable of determining the position of the user 301 relative to the display 107 and/or device 100 based on a detected image 313 of one or more body features of the user. Specifically, for this embodiment, the image sensor 311 has a viewing region 315 in which one or more body features of the user may be detected and, based on the detected image 313 of the body feature or features, the device 100 may determine the position of the user 301 and, in combination with the data collected by the motion sensor, determine the appropriate orientation for providing the image or object 101 at the output component, such as display 107.

Figure 4:
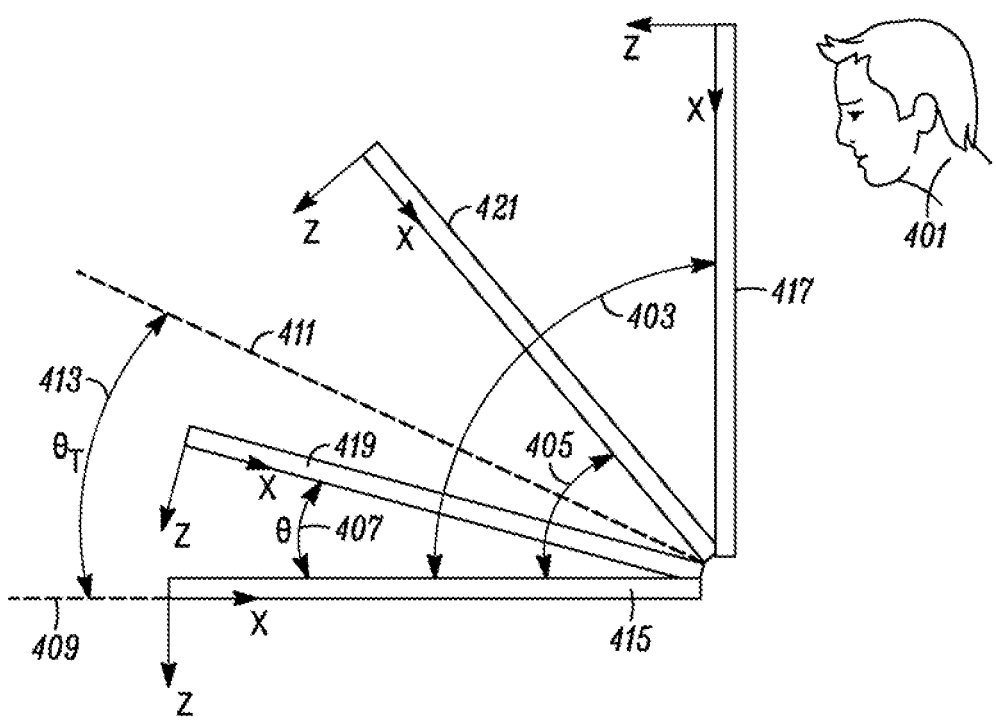
FIG. 4 is a planar side view of an embodiment of a portable electronic device shown at various angles relative to the surface of the ground.

Referring to FIG. 4, there is provided a side view of an embodiment of the portable electronic device 100, as viewed by a user 401, shown at various angles 403, 405, 407 relative to the surface of the ground or ground level 409. For one embodiment, the second sensor (such as an imager) may be activated in response to the first sensor (such as a motion sensor) detecting that the tilt angle of the device relative to the ground level 409 falls below a predetermined position 411 and/or threshold angle 413. The predetermined position 411 and/or threshold angle 413 may be determined based on the position or angle, respectively, at which the device may not be able to distinguish between portrait and landscape orientations using one sensor alone. If the second sensor detects a body feature of the user 401, such as a facial feature of a user's face, then the image or object may be oriented on the output component according to the detected body feature. Thus, when the user 401 views the image or object at the output component, the image or object is displayed at an appropriate orientation for viewing. For example, by considering tilt angle 403, 405, 407 measured by a motion sensor and a facial features detected by an imager, automatic landscape-portrait screen rotations may be managed to operate appropriately at all angles.

FIG. 4, in particular, shows a portable electronic device at various positions. At a horizontal position 415, the portable electronic device is parallel, or substantially parallel, to a surface of the ground or ground level 409, in which device is angled about zero degrees relative to the ground level. At a vertical position 417, the portable electronic device is perpendicular, or substantially perpendicular, to a surface of the ground or ground level 409, in which device is angled about 90 degrees relative to the ground level. The angle of the horizontal position 415 of the device relative to the ground level 409 is less than the threshold angle 413 and, thus, the second sensor may be used to detect a body feature of the user 401 and orient an image or object at the output component according to the detected body feature. The angle of the vertical position 417 of the device relative to the ground level 409 is greater than the threshold angle 413. The first sensor may be enough to determine the appropriate orientation of an image or object at the output component, so the second sensor may not be necessary.

The positions and angles of the portable electronic device relative to the ground level 409 are not restricted to strictly horizontal and vertical positions. At a third position 419, the portable electronic device has a third angle 407 greater than the first angle of the horizontal position 415 and less than the threshold angle 413 of the predetermined position 411. At a fourth position 421, the portable electronic device has a fourth angle 405 less than the second angle of the vertical position 417 and greater than the threshold angle 413 of the predetermined position 411. The angle of the third position 419 of the device is less than the threshold angle 413 and, thus, the second sensor may be used to detect a body feature of the user 401 and orient an image or object at the output component according to the detected body feature. The angle of the fourth position 421 of the device is greater than the threshold angle 413. The first sensor may be enough to determine the appropriate orientation of an image or object at the output component, so the second sensor may not be necessary.

For some embodiments, a 3-axis accelerometer may be used to measure projections of the Earth's gravity (denoted by g) in 3 directions, namely X, Y, and Z. The respective values for X, Y and Z may be denoted as $a_x$, $a_y$, $a_z$. When the device is orientated at a vertical position, the change of values of $a_x$ and $a_y$ when the device is rotated may indicate if the device is in a portrait or landscape orientation, as long as the value change is larger than any measurement noise. When the device is tilted (at angle θ from the horizontal direction), the largest difference between $a_x$ and $a_y$ when the device is rotated from portrait to landscape is $\Delta a_{xy} = g \sin(\theta_T)$. When the tilt angle is below a threshold (denoted by $\theta_T$), $\Delta a_{xy}$ will be smaller than measurement noise (denoted by $a_n$) and, thus, the measurement may not distinguish a portrait orientation from a landscape orientation. At a threshold angle $\theta_T$, $g \sin(\theta_T) = a_n$, so $\theta_T = \arcsin(a_n/g)$. For example, for some embodiments, $\theta_T$ may be in the range of 20 through 30 degrees. When tilt angle falls below $\theta_T$, the imager may be initiated in the background and image frames may be sent periodically to a body detection component of the device. If a body feature (such as a face) is detected, an image or objected provided by the output component of the device may be rotated to align with the detected body feature. When the tilt angle becomes larger than $\theta_T$, the imager may be stopped or ignored, and the motion sensor may be used to determine the orientation of the image or object at the output component.

Figure 5:
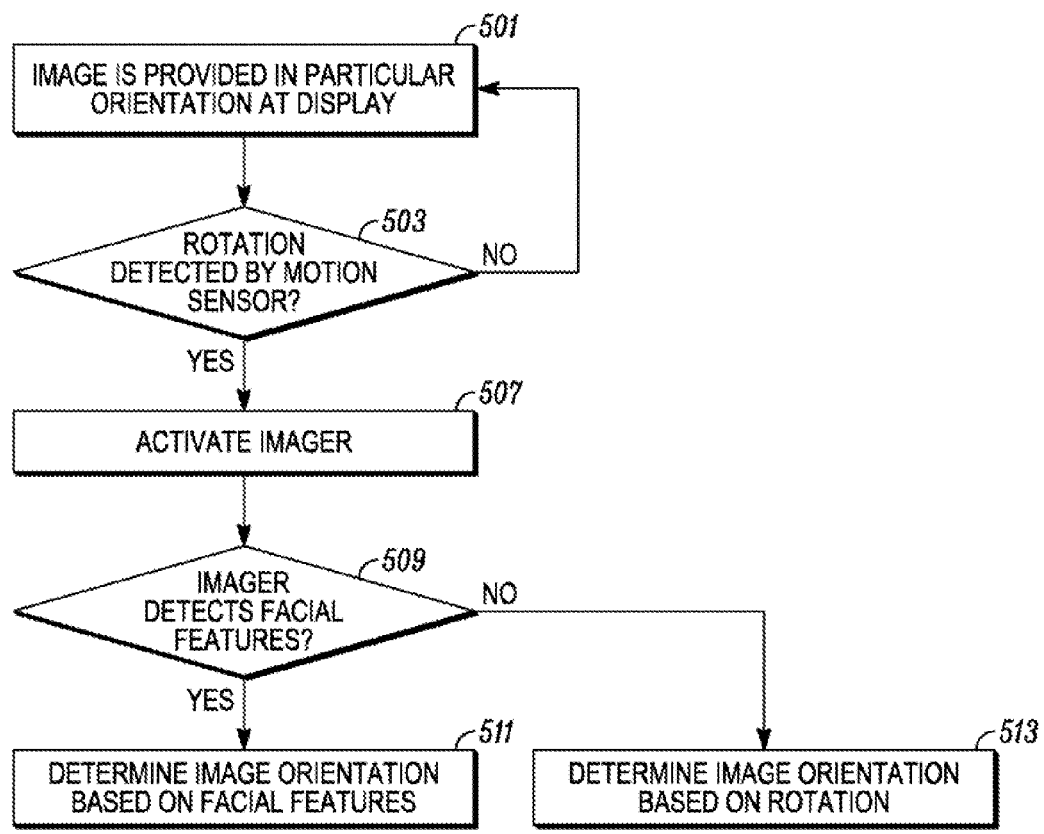
FIG. 5 is a flow diagram representing an example operation of a portable electronic device in accordance with the present invention.

Referring to FIG. 5, there is provided a flow diagram representing an example operation 500 of the portable electronic device 100. In particular, the example operation 500 represents a method of a portable electronic device for managing screen orientation, in which the device includes an output component (such as a display), a primary sensor (such as a motion sensor) and a secondary sensor (such as an image sensor). It is to be understood that operation 500 may be performed by a processor, an input component, an output component, and/or other circuit of the portable electronic device 100.

Initially, at step 501, the operation 500 identifies a particular orientation of an image or object at the output component. The image or object is provided at the output component at a first orientation before detecting rotation at the primary sensor. The operation 500 then determines, or attempts to determine, whether a rotation action has been detected by the primary sensor at step 503. For example, the rotation may be detected about an axis substantially orthogonal to a planar surface of the output component. If a rotation action has not be detected by the primary sensor, then the operation 500 will check again later. For example, as shown in FIG. 5, the operation 500 loops back to step 501 to recheck the orientation of the image or object before checking the primary sensor again. If a rotation action is detected by the primary sensor at step 503, the operation 500 may activate the secondary sensor at step 507. The secondary sensor may be activated in response to detecting the rotation at the primary sensor. The secondary sensor may be activated and inactivated in order to manage power consumption. For example, the secondary sensor may not be activated until the primary sensor determines a need for the secondary sensor. On the other hand, it is to be understood that the step 507 of activating the secondary sensor may not be necessary, for example, the secondary sensor always or substantially remains active.

After a rotation action is detected by the primary sensor at step 503, and the secondary sensor is activated at step 507 if necessary, the operation 500 determines, or attempts to determine, whether the secondary sensor detects one or more body features at step 509. If the secondary sensor detects a body feature or features, then one or more components of the device (such as the processor 203) may determine, at step 511, an appropriate orientation of the image or object provided by the output component based on the rotation detected by the primary sensor at step 503 and the body feature or features detected at step 509. On the other hand, if the secondary sensor does not detect a body feature or features, then one or more components of the device (such as the processor 203) may determine, at step 513, an appropriate orientation of the image or object provided by the output component based on the rotation detected by the primary sensor at step 503, regardless of what is detected or not detected at step 509. As a result, the image or object is provided at the output component at a second orientation after determining the orientation of the image or display at the output component. For some embodiments, if a plurality of body features is detected, then the operation 500 may select a particular body feature of the plurality of body features before utilizing this information at step 511.

As indicated above, the body feature or features may include, but is not restricted to, one or more facial features. It is to be understood that, since the body feature or features may exist anywhere around the portable electronic device, the device may include a secondary sensor that may be directed in multiple directions (manually or automatically) or multiple sensors directed in different directions about the device. For example, a device may include a front facing imager and a rear facing imager, in which one or both of the imagers may be used as the secondary sensor.

Figure 6:
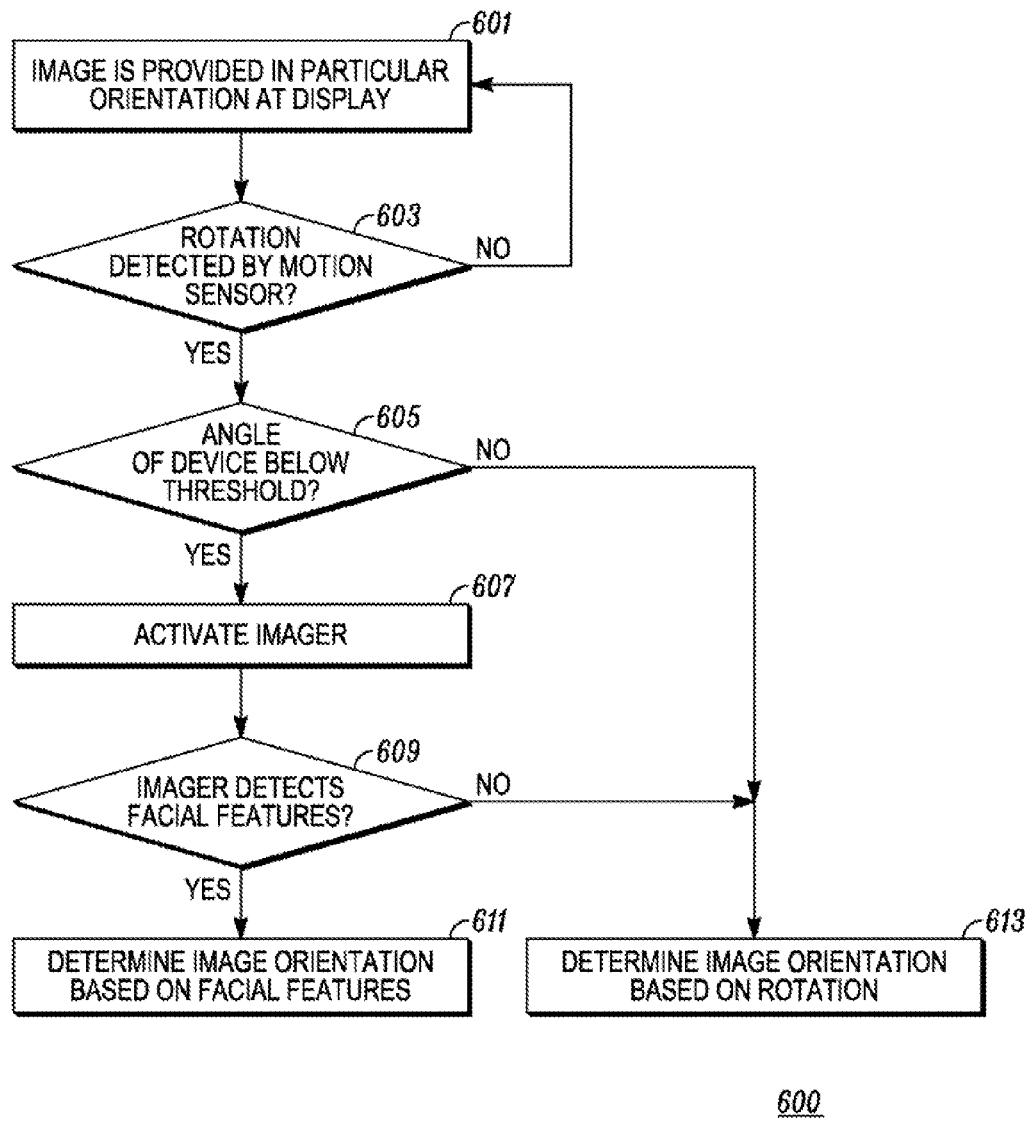
FIG. 6 is a flow diagram representing another example operation of a portable electronic device in accordance with the present invention

Referring to FIG. 6, there is provided a flow diagram representing another example operation 600 of the portable electronic device 100. In particular, the example operation 600 represents another method of a portable electronic device for managing screen orientation, in which the device includes an output component (such as a display), a primary sensor (such as a motion sensor) and a secondary sensor (such as an image sensor). It is to be understood that operation 600 may be performed by a processor, an input component, an output component, and/or other circuit of the portable electronic device 100. Example operation 600 is similar to example operation 500, so the information above regarding operation 500 may also apply to the following description for operation 600.

Initially, at step 601, the operation 600 identifies a particular orientation of an image or object at the output component. The image or object is provided at the output component at a first orientation before detecting rotation at the primary sensor. The operation 600 then determines, or attempts to determine, whether a rotation action has been detected by the primary sensor at step 603. If a rotation action has not be detected by the primary sensor, then the operation 600 will check again later. If a rotation action is detected by the primary sensor at step 603, the operation 500 may determine the angle of the portable electronic device relative to the ground surface or ground level and compare it to a threshold angle, such as the threshold angle 413 of FIG. 4.

If the angle of the device is not determined to be below the threshold in step 605, then the operation 600 may determine, at step 613, an appropriate orientation of the image or object provided by the output component based on the rotation detected by the primary sensor at step 603. If the angle of the device is determined to be below the threshold in step 605, then the operation 600 may activate the secondary sensor at step 607. The secondary sensor may be activated in response to detecting the rotation at the primary sensor. As noted above, it is to be understood that the step 607 of activating the secondary sensor may be optional.

If the angle of the device is determined to be below the threshold in step 605, and the secondary sensor is activated at step 607 if necessary, the operation 600 determines, or attempts to determine, whether the secondary sensor detects one or more body features at step 609. If the secondary sensor detects a body feature or features, then one or more components of the device (such as the processor 203) may determine, at step 611, an appropriate orientation of the image or object provided by the output component based on the rotation detected by the primary sensor at step 603 and the body feature or features detected at step 609. On the other hand, if the secondary sensor does not detect a body feature or features, then one or more components of the device (such as the processor 203) may determine, at step 613, an appropriate orientation of the image or object provided by the output component based on the rotation detected by the primary sensor at step 603, regardless of what is detected or not detected at step 609. As a result, the image or object is provided at the output component at a second orientation after determining the orientation of the image or display at the output component. For some embodiments, if a plurality of body features is detected, then the operation 600 may select a particular body feature of the plurality of body features before utilizing this information at step 611.

Figure 7:
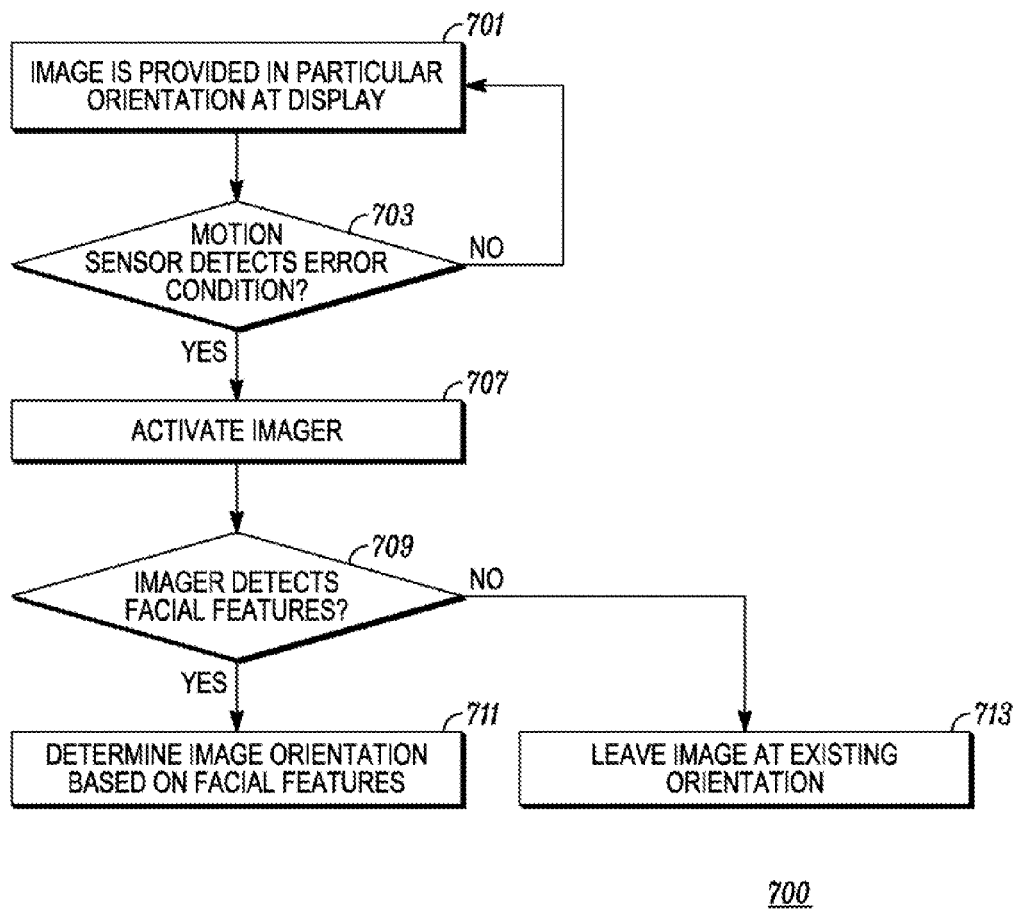
FIG. 7 is a flow diagram representing yet another example operation of a portable electronic device in accordance with the present invention.

Referring to FIG. 7, there is provided a flow diagram representing yet another example operation 700 of the portable electronic device 100. In particular, the example operation 700 represents another method of a portable electronic device for managing screen orientation, in which the device includes an output component (such as a display), a primary sensor (such as a motion sensor) and a secondary sensor (such as an image sensor). It is to be understood that operation 700 may be performed by a processor, an input component, an output component, and/or other circuit of the portable electronic device 100. Example operation 700 is similar to example operations 500 and 600, so the information above regarding operations 500 and 600 may also apply to the following description for operation 700.

Initially, at step 701, the operation 700 identifies a particular orientation of an image or object at the output component. The image or object is provided at the output component at a first orientation before detecting a primary sensor error condition. The operation 700 then attempts to detect a rotation action at the primary sensor. In particular, as represented by FIG. 7, the operation 700 determines whether the primary sensor detects an error condition at step 703. For example, an error condition may be associated with the inability of the primary sensor to determine whether rotation has occurred or with a failure of the detected measurement of the rotation to meet or exceed a predetermined rotation threshold. It should be noted that the error condition may be caused by a failure in the measurement system itself or because the device is operating outside a normal gravitational field. If an error condition of the rotation is not detected by the primary sensor, then the operation 700 will check again later. The secondary sensor may be activated in response to detecting the primary sensor error condition at the primary sensor. As noted above, it is to be understood that the step 707 of activating the secondary sensor may be optional.

If the primary sensor error condition is detected in step 703, and the secondary sensor is activated at step 707 if necessary, the operation 700 determines whether the secondary sensor detects one or more body features at step 709. If the secondary sensor detects a body feature or features, then one or more components of the device (such as the processor 203) may determine, at step 711, an appropriate orientation of the image or object provided by the output component based on the body feature or features detected at step 709. On the other hand, if the secondary sensor does not detect a body feature or features, then one or more components of the device (such as the processor 203) may determine, at step 713, an appropriate orientation of the image or object provided by the output component based on previous orientation at step 701, regardless of what is detected or not detected at step 709. As a result, the image or object is provided at the output component at a second orientation, which in this case is the same as the first orientation, after determining the orientation of the image or display at the output component, since the orientation of the image or object is left unchanged. For some embodiments, instead of leaving the image or object at the existing orientation, the second orientation may be set to a default orientation, which may or may not be the same as the first orientation.

For other embodiments, if a plurality of body features is detected, then the operation 700 may select a particular body feature of the plurality of body features before utilizing this information at step 711. Again, it is to be understood that the device may include a secondary sensor that may be directed in multiple directions (manually or automatically) or multiple sensors directed in different directions about the device.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of a portable electronic device for managing screen orientation, the portable electronic device including a display, a motion sensor and an image sensor, the method comprising:
attempting to detect a rotation at the motion sensor;
detecting an angle of the device relative to a ground surface;
activating the image sensor in response to detecting that the angle of the device relative to the ground surface is less than a predetermined threshold angle between the ground surface and a predefined position relative to the ground surface, wherein the angle between the predefined position and the ground surface is in the range of 20 to 30 degrees;
attempting to detect at least one body feature at the image sensor; and
determining an orientation of an image at the display in response to detecting at least one of the rotation at the motion sensor or the at least one body feature at the image sensor.

2. The method of claim 1, further comprising:
providing the image at the display at a first orientation before attempting to detect the rotation at the motion sensor; and
providing the image at the display at a second orientation after determining the orientation of the image at the display.

3. The method of claim 1, wherein attempting to detect the rotation at the motion sensor includes detecting the rotation about an axis substantially orthogonal to a planar surface of the display.

4. The method of claim 1, further comprising activating the image sensor in response to attempting to detect the rotation at the motion sensor.

5. The method of claim 1, wherein attempting to detect the at least one body feature at the image sensor includes detecting the at least one body feature in response to activating the image sensor.

6. The method of claim 1, wherein attempting to detect the at least one body feature at the image sensor includes detecting at least one facial feature at the image sensor.

7. The method of claim 1, wherein attempting to detect the at least one body feature at the image sensor comprises:
detecting a plurality of body features; and
selecting a particular body feature of the plurality of body features.

8. The method of claim 1, wherein determining the orientation of the image at the display includes determining the orientation of the image based on the at least one body feature detected at the image sensor.

9. The method of claim 1, wherein determining the orientation of the image at the display includes determining the orientation of the image based on the rotation detected at the motion sensor.

10. The method of claim 1, wherein attempting to detect the rotation at the motion sensor includes detecting an error condition at the motion sensor.

11. The method of claim 1, further comprising determining the predetermined threshold angle based on an angle at which the device is able to distinguish between portrait and landscape orientations.

12. The method of claim 1, wherein detecting the angle of the device relative to the ground surface comprises detecting an angle of an arc from the device to the ground surface.

13. The method of claim 1, further comprising:
determining whether the angle of the device relative to the ground surface is less than the predetermined threshold angle between the ground surface and the predefined position relative to the ground surface; and
responsive to determining that the angle of the device relative to the ground surface is not less than the predetermined threshold angle between the predefined position and the ground surface, not activating the image sensor.

14. A portable electronic device capable of managing screen orientation comprising:

a display configured to provide an image at a first orientation;

a motion sensor configured to:

attempt to detect a rotation of the portable electronic device; and attempt to detect an angle of the portable electronic device relative to a ground surface;

a processor configured to activate an image sensor in response to detecting that the angle of the portable electronic device relative to the ground surface is less than a predetermined threshold angle between the ground surface and a predefined position relative to the ground surface, wherein the angle between the predefined position and the ground surface is in the range of 20 to 30 degrees;

the image sensor configured to attempt to detect at least one body feature; and the processor configured to determine a second orientation of the image at the display based on at least one of the rotation detected at the motion sensor or the at least one body feature detected at the image sensor.

15. The portable electronic device of claim 14, wherein:

the display provides the image at the display at the first orientation before the motion sensor attempts to detect the rotation; and the display provides the image at the display at the second orientation after the processor determines the second orientation of the image.

16. The portable electronic device of claim 14, wherein:

the display includes a planar surface; and the motion sensor detects the rotation about an axis substantially orthogonal to the planar surface of the display.

17. The portable electronic device of claim 14, wherein the image sensor is activated in response to the motion sensor attempting to detect the rotation.

18. The portable electronic device of claim 14, wherein the image sensor detects the at least one body feature in response to the image sensor being activated.

19. The portable electronic device of claim 14, wherein the processor determines the second orientation of the image based on the at least one body feature being detected at the image sensor.

20. The portable electronic device of claim 14, wherein the processor determines the second orientation of the image based on the rotation detected at the motion sensor.

21. The portable electronic device of claim 14, wherein the motion sensor detects an error condition in response to attempting to detect the rotation of the portable electronic device.

* * * * *